B. C. ZUHARS AND H. D. CLARKE.
COMBINED BRAKE AND REAR PILOT.
APPLICATION FILED JAN. 21, 1920.
1,427,993.
Patented Sept. 5, 1922.
3 SHEETS—SHEET 1.
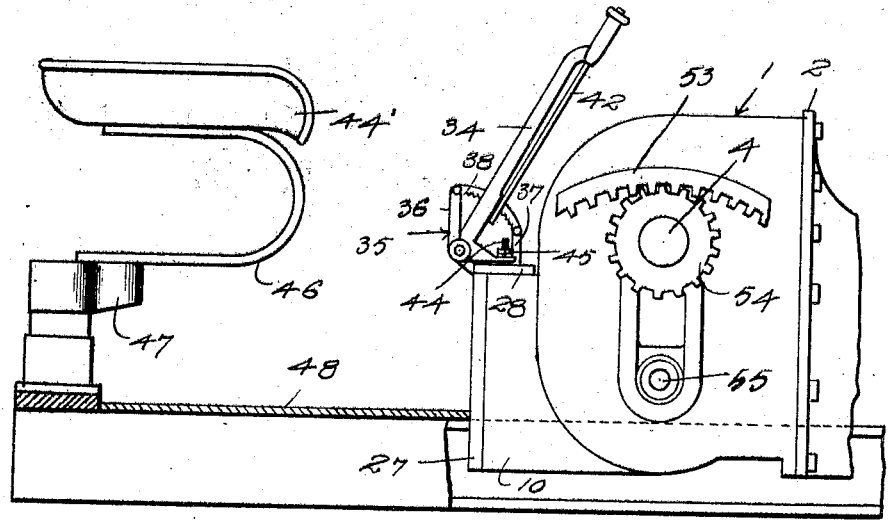
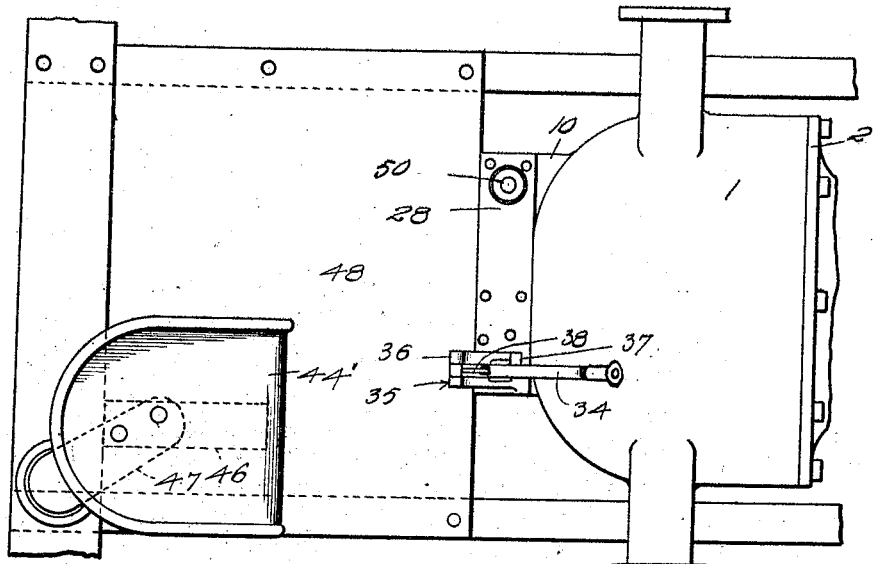
Inventors
B.C. Zuhars
H.D. Clarke
By [signature] Atty

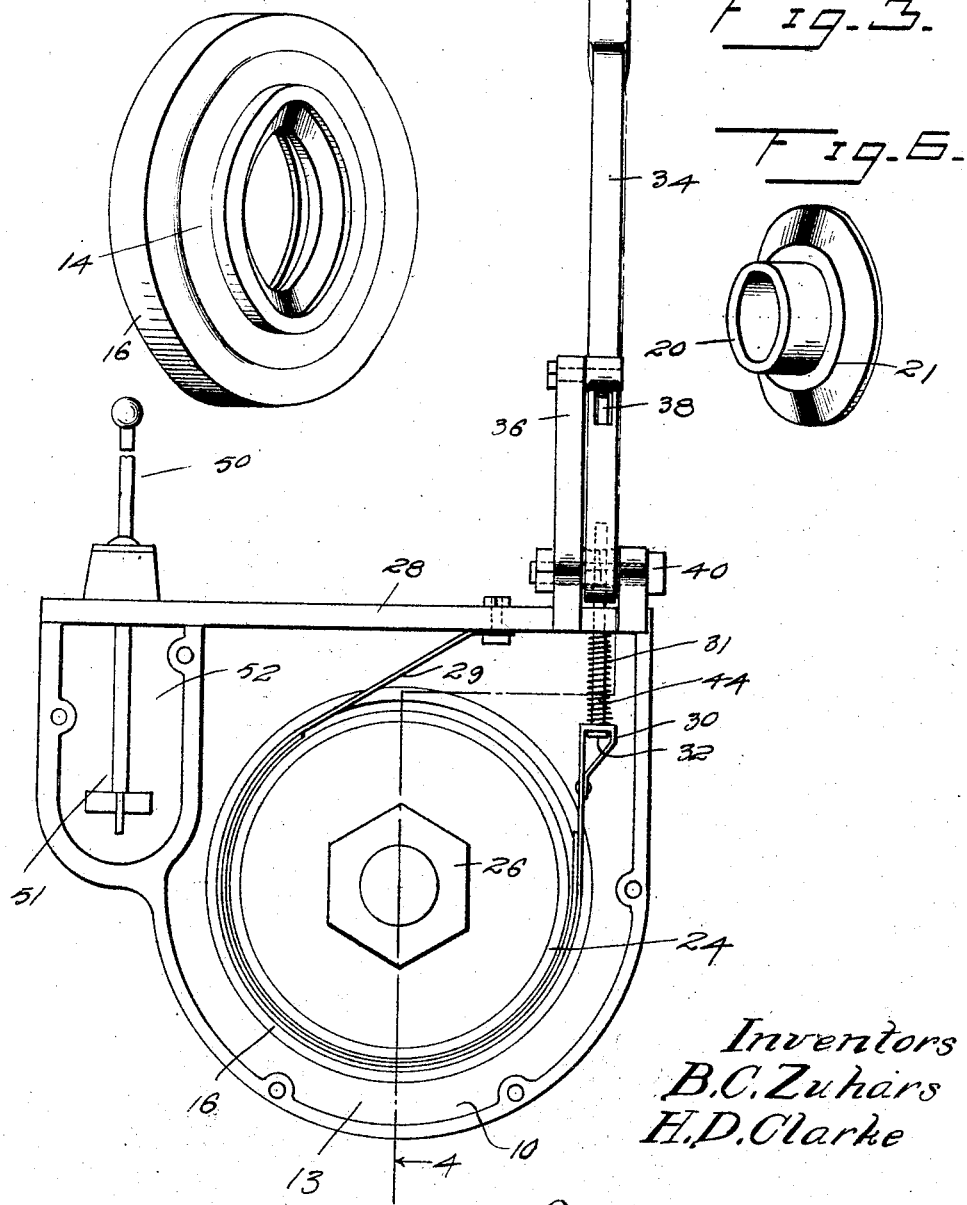

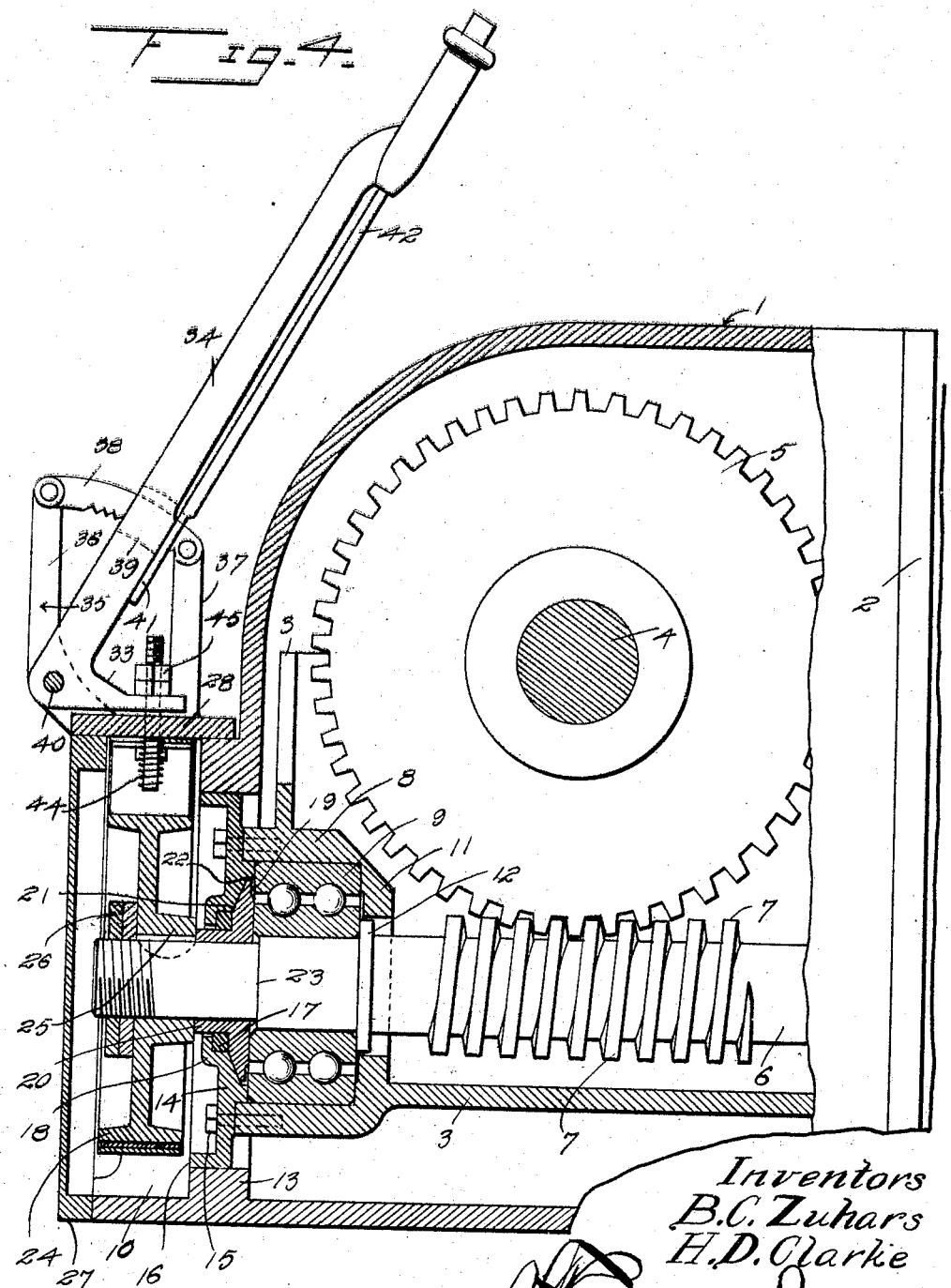

Patented Sept. 5, 1922.

1,427,993

UNITED STATES PATENT OFFICE.

BENJAMIN C. ZUHARS AND HARRY D. CLARKE, OF COLUMBUS, OHIO, ASSIGNORS TO THE OHIO TRACTOR COMPANY, OF COLUMBUS, OHIO, A CORPORATION OF OHIO.

COMBINED BRAKE AND REAR PILOT.

Application filed January 21, 1920. Serial No. 353,042.

*To all whom it may concern:*

Be it known that we, BENJAMIN C. ZUHARS and HARRY DON CLARKE, citizens of the United States, residing at Grand View Heights, Columbus, in the county of Franklin and State of Ohio, have invented certain new and useful Improvements in Combined Brakes and Rear Pilots; and we do hereby declare the following to be a full, clear, and exact description of the invention, such as will enable others skilled in the art to which it appertains to make and use the same.

This invention relates to new and useful improvements in tractor or motor vehicle constructions and has for its primary object the provision of means which permits the employment of a brake on the worm shaft of a differential used in a double reduction drive of the character set forth and claimed in an application for United States Letters Patent, filed March 14, 1919 and serially numbered 282,655, whereby a comparatively small expenditure of force will result in the locking of the traction or drive wheels, owing to the leverage obtained by the arrangement of gearing in said drive.

Another object of this invention is the provision of means which permits the worm shaft of the differential to extend exteriorly of the differential housing so that the brake can be applied thereto and which means performs the function of consuming some of the worm action and also prevents the worm shaft from being moved out of alinement by the action of the brake.

With these and other objects in view as will become more apparent as the description proceeds, the invention consists in certain novel features of construction, combination, and arrangement of parts as will be hereinafter more fully described and claimed.

For a complete understanding of our invention, reference is to be had to the following description and accompanying drawings, in which:—

Figure 1 is a fragmentary side elevation partly in section illustrating a tractor or motor vehicle construction, constructed in accordance with our invention.

Figure 2 is a plan view of the same, illustrating the location of the operator's feet in respect to the brake lever, Figure 3 is a rear elevation illustrating the brake and with the cover of the brake housing removed, Figure 4 is a sectional view taken on the line 4—4 of Figure 3, illustrating the brake and the pilot bearing, Figure 5 is a perspective view, illustrating a thrust plate, Figure 6 is a similar view of a lubricant retaining plate.

Referring in detail to the drawings, the numeral 1 indicates a differential casing, the enlarged or bowl portion of which is provided with a front opening closed by a cover 2 which forms an integral structure with a transmission casing (not shown) and is detachably secured to the differential housing 1 by bolts or like fasteners. A hanger 3 is formed integrally with the cover 2 and is disposed within the bowl or enlarged portion of the differential casing 1 and is provided with suitable bearings (not shown) for rotatably supporting drive or live axles 4 that have connection with a differential including a worm wheel 5 and a worm shaft 6 provided with a worm 7 which meshes with the worm wheel 5. The rear portion of the hanger 3 has formed therein a bearing casing 8 to receive a bearing 9 which rotatably supports the rear portion of the worm shaft 6 and permits said worm shaft to extend into a brake housing 10 formed integrally with the rear portion of the differential housing 1. An annular flange 11 is formed on the bearing casing 8 and is adapted to limit the movement of the bearing 9 in one direction and is spaced from the worm shaft 6 so as to permit lubricant within the differential housing 1 to reach the bearing 9. A collar 12 is formed integrally with the worm shaft 6 and abuts the bearing 9 and is spaced from the walls of the opening in the annular flange 11 so as to permit the lubricant to pass the same and lubricate the bearing 9.

A flange 13 is formed integrally with the differential housing 1 and surrounds the opening between said housing and the brake housing 10. A thrust plate 14 is detachably secured to the bearing casing 8 by fasteners 15 and has formed upon its periphery an annular flange 16 which abuts the flange 13 of the differential housing 1. The thrust plate 14 is provided with an opening to permit the worm shaft 6 to extend through the same and has formed thereon a lateral flange 110

18 which is spaced from the worm shaft and receives a packing 17. A lubricant retaining plate 19 is provided with a hub portion 20 that is mounted on the worm shaft 6 and has contact with the packing 17. The outer face of the lubricant retaining plate 19 is bevelled as shown at 21 and is adapted to fit into a concaved recess 22 formed in the thrust plate 14. The other face of the lubricant retaining plate 19 is disposed straight and abuts the bearing 9 for limiting the movement of the same in one direction and forces the bearing 9 against the collar 12 formed integrally with the worm shaft 6.

A brake wheel 24 is provided with a hub 25 that is splined or otherwise slidably secured to the rear end of the worm shaft 6 and is located wholly within the brake housing 10. A nut 26 is threaded to the end of the worm shaft 6 against the brake wheel 24 so as to force the hub 25 thereof into engagement with the hub or cylindrical portion 20 of the lubricant retaining plate, which in turn forces the plate into engagement with the bearing 9 on the worm shaft, thus it will be noted that a frictional lock is established between the brake wheel and the lubricant retaining plate 19 which causes said plate to rotate with the worm shaft 6. Owing to the rotation of the lubricant retaining plate 19, a centrifugal action is set up which will have a tendency to force the lubricant in the direction of the worm or within the differential housing 1 when said lubricant passes beyond the bearing 9. If some of the lubricant passes the lubricant retaining plate 19, the packing 17 prevents said lubricant from entering the brake housing 10.

The flange 16 upon the thrust plate 14 is machined to fit the wall of the opening in the differential casing 1 very tightly so as to prevent the escape of lubricant from the differential casing 1 into the brake housing 10. The brake housing 10 is formed integrally with the differential housing 1 and includes bottom and side walls, and has its rear end fully opened and is closed by a removable plate 27. The top of the brake housing 10 is closed by a top plate 28 and has one end of a brake band 29 secured thereto. The brake band 29 passes about the periphery of the brake wheel 24 and has its free end bent to form an anchoring head 30. A bolt 31 passes through the anchoring head 30 and has its head 32 confined within the anchoring head 30 to hold the bolt against rotation. The bolt 31 extends upwardly through an opening formed in the top plate 28 of the brake housing and also through an opening in the foot 33 formed on the pivoted end of a brake lever 34. A support 35 is secured to the top plate 28 and includes pairs of vertically disposed arms 36 and 37 respectively, to which is secured a rack bar 38. The rack bar 38 passes through a slot 39 formed in the brake lever 34. The brake lever 34 is pivoted between the arms 36 of the support 35 as shown at 40 and said brake lever is provided with a dog 41 which is moved into and out of engagement with the teeth of the rack bar 38 by a controlling means 42 carried by said brake lever 34 providing a construction wherein the brake lever can be locked at various brake applying positions. When the brake lever 34 is in a non-brake applying position, the same is disposed at an angle of approximately 45 degrees and at such a position that the operator seated on the seat 44' can obtain a straight pull from the shoulder upon the brake lever, rendering it comparatively easy to operate or move the brake lever into brake applying position.

A spring 44 is mounted on the bolt 31 and is interposed between the head 30 of the brake band and the top plate for the purpose of slackening the brake band on the brake wheel when the brake lever is moved into non-brake applying position. Nuts 45 are turned onto the bolt 31 for securing said bolt to the brake lever and also providing a construction wherein the adjustment of the brake band about the periphery of the brake wheel can be accomplished from the exterior of the brake housing 10.

The seat 44' is secured to a spring 46 which is in turn secured to an adjustable stand 47 carried by a platform 48 on the rear end of the tractor frame. By having the seat 44' so secured to the platform 48, it provides a construction which will permit of the seat being swung out of the way of the operator when not desiring to use the same, and it is also to be noted that this seat is conveniently positioned to permit the operator to actuate the transmission shifting lever 50. The transmission shifting lever 50 has connection with shifting rods 51 located in an auxiliary housing 52 formed within the brake housing and which structure forms the subject matter for a co-pending application.

From the foregoing description taken in connection with the accompanying drawings, it will be noted that the bearing 9 acts as a rear pilot to the worm shaft 6 for the purpose of consuming a portion of the thrust or worm action of the worm 7 and also will prevent the worm shaft 6 from being moved out of alinement by the application or strain created by the applying of the brake to the brake wheel. It is further to be noted that by having the brake applied to the worm shaft, a great leverage is obtained on the drive or traction wheel (not shown) of the tractor as the brake has the advantage of the gearing in the double reduction drive of the application for U. S. Letters Patent heretofore referred to.

The character 53 indicates portions of internal ring gears of traction wheels and are in mesh with pinions 54 secured to the outer ends of the live or drive axles 4 and said traction wheels are adapted to be journaled on load carrying axles 55.

While we have shown and described the preferred embodiment of our invention, it will be understood that minor changes in construction, combination, and arrangement of parts may be made without departing from the spirit and scope of the invention as claimed.

Having thus described our invention, what we claim is:—

1. In a tractor, a platform located at the rear of the tractor, a main driven shaft extending to the rear of said tractor and terminating at or near the rear end thereof, a brake secured to said rear end of said shaft, a brake lever above said brake and in close proximity to the platform, and brake connections extending upwardly from said brake to said lever.

2. In a tractor, a platform located at the rear of the tractor, a seat on the platform, a main driven shaft extending to the rear of said tractor and terminating at or near the rear end thereof, a brake secured to said rear end of said shaft, a brake lever above said brake and in close proximity to said seat and at one side of the center of the tractor, and brake connections extending upwardly from said brake to said lever.

3. In a tractor, the combination of a driven shaft, a gear casing, a set of reduction gears within said casing and another set of reduction gears located near the ground wheels of the tractor, an extension to said driven shaft, a brake wheel secured to said extension, and a pilot bearing between the reduction gear and the brake wheel.

4. In a tractor, the combination of a driven shaft, a set of reduction gears, a gear casing enclosing said gears, said driven shaft extending through said bearing and to a predetermined point beyond same, a brake located on the end of said shaft, and operating mechanism located rearwardly of said gear casing.

5. In a tractor, the combination of a driven shaft, a set of reduction gears for same, a gear casing for enclosing same, an additional casing located near said gear casing, transmission mechanism located within said last-mentioned casing, a pilot bearing for said driven shaft located rearwardly of said gear casing, said shaft extending through said bearing, a brake device upon the end of said shaft, and mechanism for operating same located above said brake and rearwardly of said gear casing.

6. In a tractor, a platform, a gear casing in proximity to said platform and extending above same, a driven shaft extending into said casing, a set of reduction gears connected therewith located within said casing, an additional casing in proximity to said gear casing, transmission mechanism extending within said last-mentioned casing, a brake secured to the end of the driven shaft and forwardly above said platform, and means for operating said brake in close proximity to said platform, for the purpose specified.

7. The combination with a gear casing, a worm shaft extending into said casing, a set of reduction gears also located within said casing, a pilot bearing for the end of said shaft, a lubricant retaining plate in proximity to said bearing, a brake located on said shaft at one side of said plate, and means for securing said brake to said shaft and simultaneously holding said lubricant plate against the shaft, whereby it will rotate with said shaft, for the purpose specified.

In testimony whereof we affix our signatures in presence of two witnesses.

BENJAMIN C. ZUHARS.
HARRY D. CLARKE.

Witnesses:
WILLIAM F. GARRETT,
JAMES F. LANGHEAD.